United States Patent [19]

Kohout

[11] Patent Number: 5,592,760
[45] Date of Patent: Jan. 14, 1997

[54] LABOR-SAVING MATERIALS DISPENSER

[76] Inventor: Darryl A. Kohout, P.O. Box 524, Waite Park, Minn. 56387

[21] Appl. No.: 506,709

[22] Filed: Jul. 25, 1995

[51] Int. Cl.⁶ .................................................. E02F 5/22
[52] U.S. Cl. .............................. 37/403; 37/192.5; 37/903; 414/526
[58] Field of Search .................. 37/189, 190, 142.5, 37/403, 420, 903; 405/248, 267, 313, 526, 723; 414/142.5, 313, 526, 723; 172/108, 109, 272; 222/272

[56] References Cited

U.S. PATENT DOCUMENTS

| | | |
|---|---|---|
| 3,967,913 | 7/1976 | Gabriel, Jr. . |
| 4,055,255 | 10/1977 | Vasquez ............................. 222/272 X |
| 4,113,023 | 9/1978 | Baskett ................................. 37/403 X |
| 4,215,949 | 8/1980 | Gabriel, Jr. . |
| 4,704,046 | 11/1987 | Yant . |
| 4,864,748 | 9/1989 | Boyer ................................. 37/403 X |
| 4,912,862 | 4/1990 | Bishop et al. ....................... 37/190 X |
| 5,158,394 | 10/1992 | Bresnahan . |
| 5,353,851 | 10/1994 | Cline .................................... 37/903 X |
| 5,379,534 | 1/1995 | Negishi ................................ 37/403 X |

*Primary Examiner*—Terry Lee Melius
*Assistant Examiner*—Robert Pezzuto
*Attorney, Agent, or Firm*—Richard C. Litman

[57] ABSTRACT

A labor-saving materials dispenser comprises a bucket with a hydraulically actuated auger mounted inside. The dispenser is configured to be mounted to arms of a loader. In use, the bucket is loaded with material to be dispensed, such as by submersing the bucket in the material to be dispensed, so that the material is collected in a receptacle portion of the bucket. The bucket is then oriented so that a hole in the bucket is near a location where the user desires to place the material to be dispensed. The auger is then used to impel the material from the bucket, through the hole, and into the desired position for use. The materials dispenser saves labor and clean-up work, as compared with manual dispensing and with other materials-dispensing apparatus.

8 Claims, 4 Drawing Sheets

LABOR-SAVING MATERIALS DISPENSER

BACKGROUND OF THE INVENTION

1. Field of the Invention

The present invention relates generally to dispensing apparatus, and more particularly to mounted buckets useful for dispensing thick, flowable materials, such as fertilizer, landscaping material, and the like.

2. Description of the Prior Art

Moving massive materials, such as fertilizer, dirt, and construction and landscaping materials, can consume enormous volumes of labor and time, unless specialized tools are used. Because both labor and time are limited resources, numerous attempts have been made to reduce the amount of time and labor necessary to move massive materials.

U.S. Pat. No. 3,967,913, issued to Gifford W. Gabriel, Jr., on Jul. 6, 1976, shows an asphalt roadway patching apparatus including a lowering supply hopper. There is no side hole that receives material from a rotating auger; instead, a central outlet dispenses material in such a way that a user's view of dispensed material is undesirably obstructed. Neither is there mounting means for a loader.

U.S. Pat. No. 4,215,949, issued to Gifford W. Gabriel, Jr., on Aug. 5, 1980, shows a self-contained asphalt patching apparatus with an auger that dispenses asphalt and is powered by a hydraulic motor. There is no mounting means for a loader.

U.S. Pat. No. 4,704,046, issued to Robert M. Yant, on Nov. 3, 1987, shows a pavement patching vehicle including a supply hopper with a rear opening for discharging asphalt supplied by an auger. There is no mounting means for a loader.

U.S. Pat. No. 5,158,394, issued to Pat Bresnahan, on Oct. 27, 1992, shows a spreader device intended to be attached to a dispensing truck. The dispensing truck dispenses particulate material into a top opening of the device and, simultaneously, the device dispenses received particulate matter through a lower opening. There is no auger for moving materials, and no mounting means for a loader.

Japanese Patent Document No. 4-47008, issued on Jun. 14, 1990, shows a complicated tractor mounted device having a receptacle and an internal auger. Materials are dispensed through a side of the device. Projections on both front and rear sides of this device mean that filling this device with materials to be dispensed can practically be accomplished only by inserting the materials through a top opening of the device, rather than by using the device to scoop up materials.

Soviet Patent Document No. 487197, issued on Jan. 14, 1976, shows an auger-assisted materials dispenser. There is no mounting means for a loader.

French Patent Document No. 91 04992, issued on Oct. 25, 1991, shows an auger-assisted materials dispenser. There is no mounting means for a loader.

None of the above inventions and patents, taken either singly or in combination, is seen to describe the instant invention as claimed.

SUMMARY OF THE INVENTION

A labor-saving materials dispenser according to the present invention comprises a prism-shaped bucket receptacle with a hydraulically actuated auger mounted inside. In use, the bucket receptacle is loaded with material to be dispensed, such as by submersing the bucket in the material to be dispensed, so that the material is collected in a receptacle portion of the bucket receptacle. The bucket receptacle is then oriented so that an aperture in the bucket receptacle is near a location where the user desires to place the material to be dispensed. The auger is then used to impel the material from the bucket receptacle, through the aperture, and into the desired position for use. The materials dispenser saves labor and clean-up work, as compared with manual and other materials-dispensing apparatus.

Accordingly, it is a principal object of the invention to save labor and clean-up time during materials-dispensing operations.

It is another object of the invention to provide an easy way to fill and manipulate a materials-dispensing apparatus by providing the apparatus with mounting means for mounting the apparatus to a loader.

It is a further object of the invention to avoid problems associated with expansion of materials in auger tubes.

Still another object of the invention is to provide a materials dispenser that is essentially independent in operation from any vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
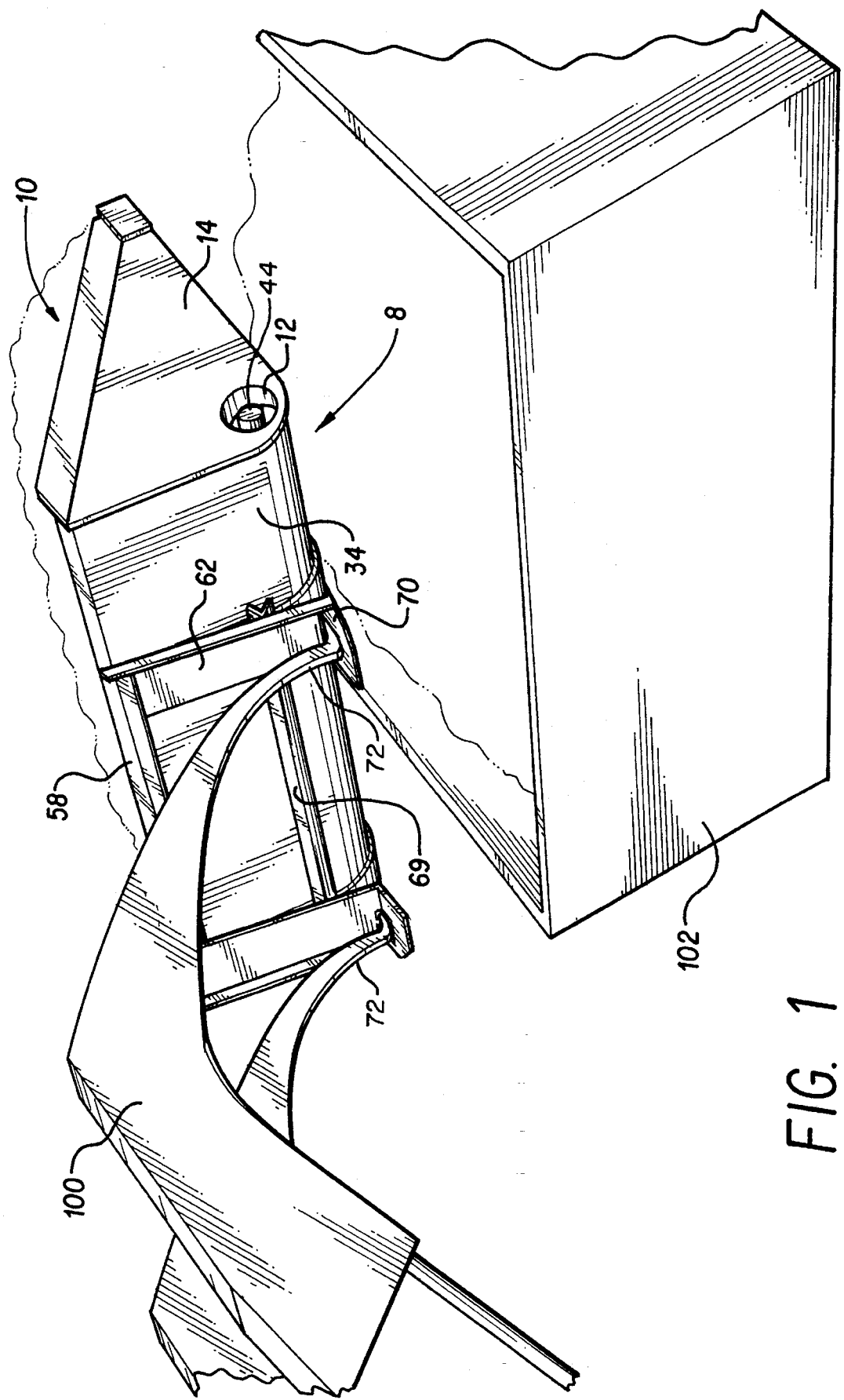
FIG. 1 is an environmental, perspective view, of a first embodiment of the present invention when mounted on arms of a tractor.

Fulfilling a common need to reduce labor and time devoted to moving and placing heavy, flowable materials, the present invention provides for easy loading and accurate, easy dispensing of heavy, flowable materials.

Referring to the drawings, a labor-saving materials dispenser 8 according to the present invention has a bucket-style materials receptacle 10 shaped like an open prism and having a dispensing aperture 12 in a first side 14 and an axle mounting aperture 16 in an opposing second side 18. Inside the materials receptacle 10, there is a generally rectangular vertical mounting plate 20 having an auger aperture 22 and a motor aperture 24. The mounting plate 20 is preferably welded in the materials receptacle 10, approximately six inches from the second side 18.

A motor-means 26, preferably a conventional hydraulic motor 26 supplied with hydraulic power via a supply line 28 and a withdrawal line 30 is mounted by known means inside the materials receptacle 10, on the mounting plate 20. Use of the materials dispenser 8 with a conventional loader 100 is thus simplified, inasmuch as a conventional loader 100 has means for supplying and withdrawing hydraulic fluid. Support of the lines 28, 30, is accomplished by springed support rod 32 mounted on a rear wall 34 of the materials receptacle 10. A drive axle 36 extends from, and is rotated by, the hydraulic motor 26, through the vertical mounting plate 20. A drive gear 38 is mounted on the drive axle 36 and engages a drive chain 40.

An auger 48 includes an auger axle 42 having a first end 44 and a second end 46, the auger axle 42 extending along and inside the auger 48. The first end 44 of the auger axle 42 projects through the dispensing aperture 12. The second end 46 of the auger axle 42 extends through the auger aperture 22. The drive chain 40 engages not only the drive gear 38, but also an auger gear 41 that is mounted on the second end 46 of the auger axle 42. Bearing units 50 mounted around the auger axle 42 at the auger aperture 22 and the auger mounting aperture 16 aid in free rotation of the auger axle 42. Preferably, there is a cover 51 attached, preferably by bolting, to the materials receptacle 10 that covers and protects the second end 46 of the auger axle 42, the drive chain 40, the drive gear 38, the auger gear 41, and the bearing units 50.

A guidance flange 52 is mounted inside the materials receptacle 10, around the dispensing aperture 12. The guidance flange 52 is tubular and includes a semicircular extension 54 to improve flow rate of material through the dispensing aperture 12 and to support the auger 48 adjacent the dispensing aperture 12.

Figure 1A:
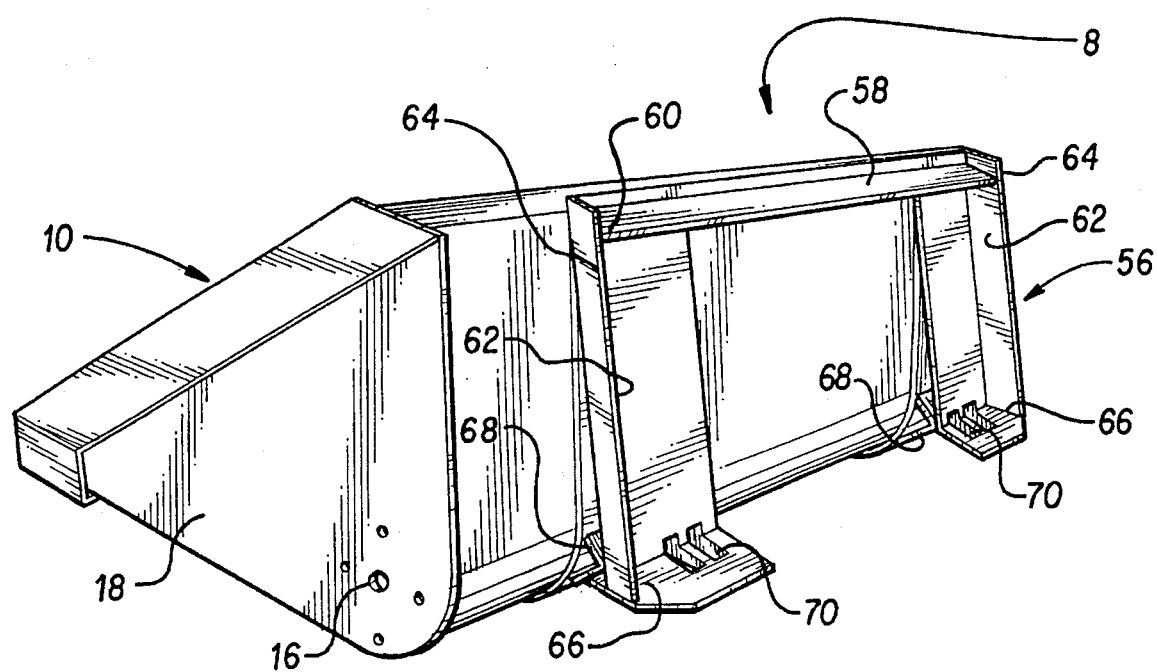
FIG. 1A is a rear, elevational of the first embodiment of the present invention.
Figure 2:
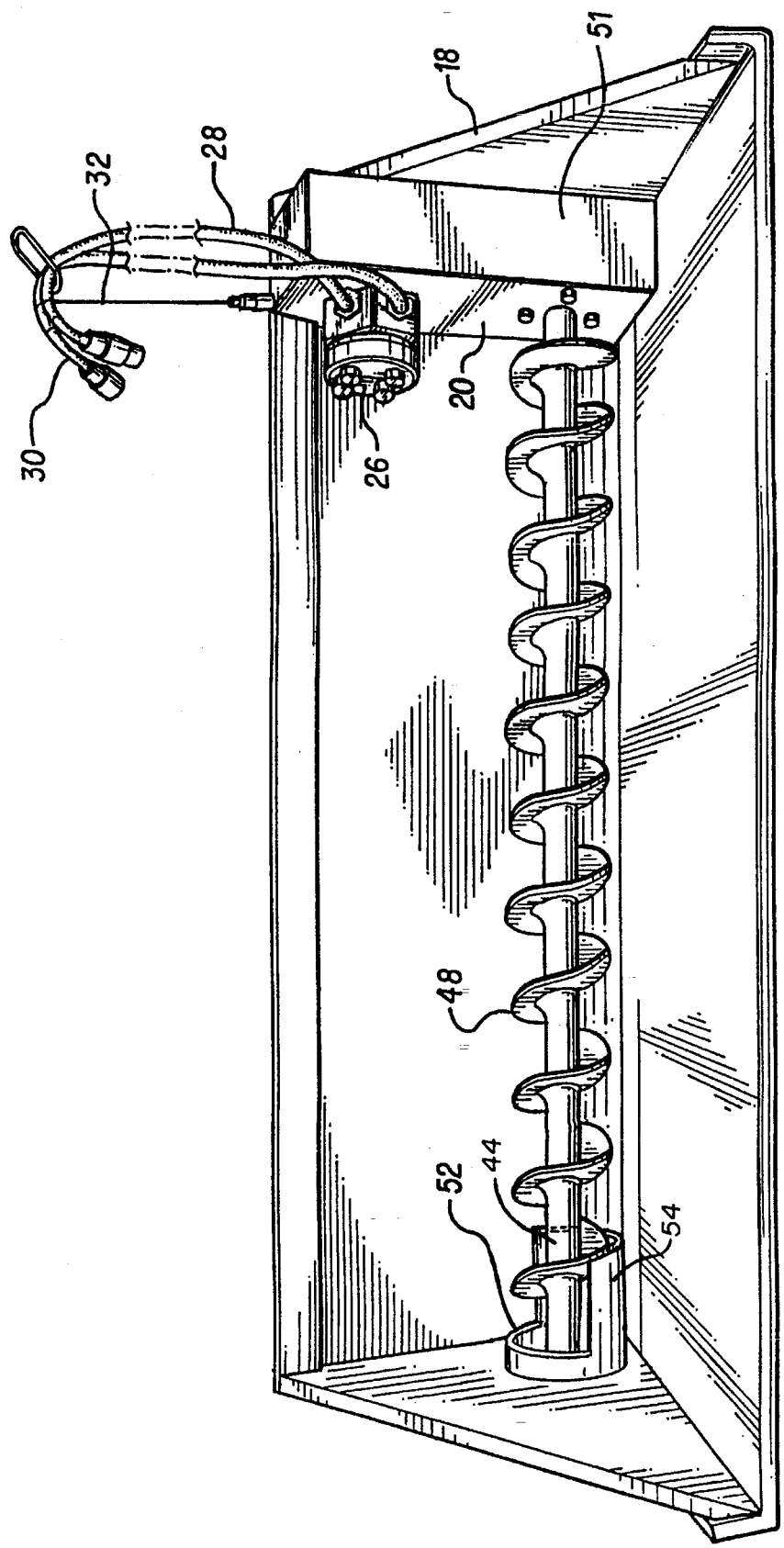
FIG. 2 is a perspective view of a second embodiment of the present invention.
Figure 3:
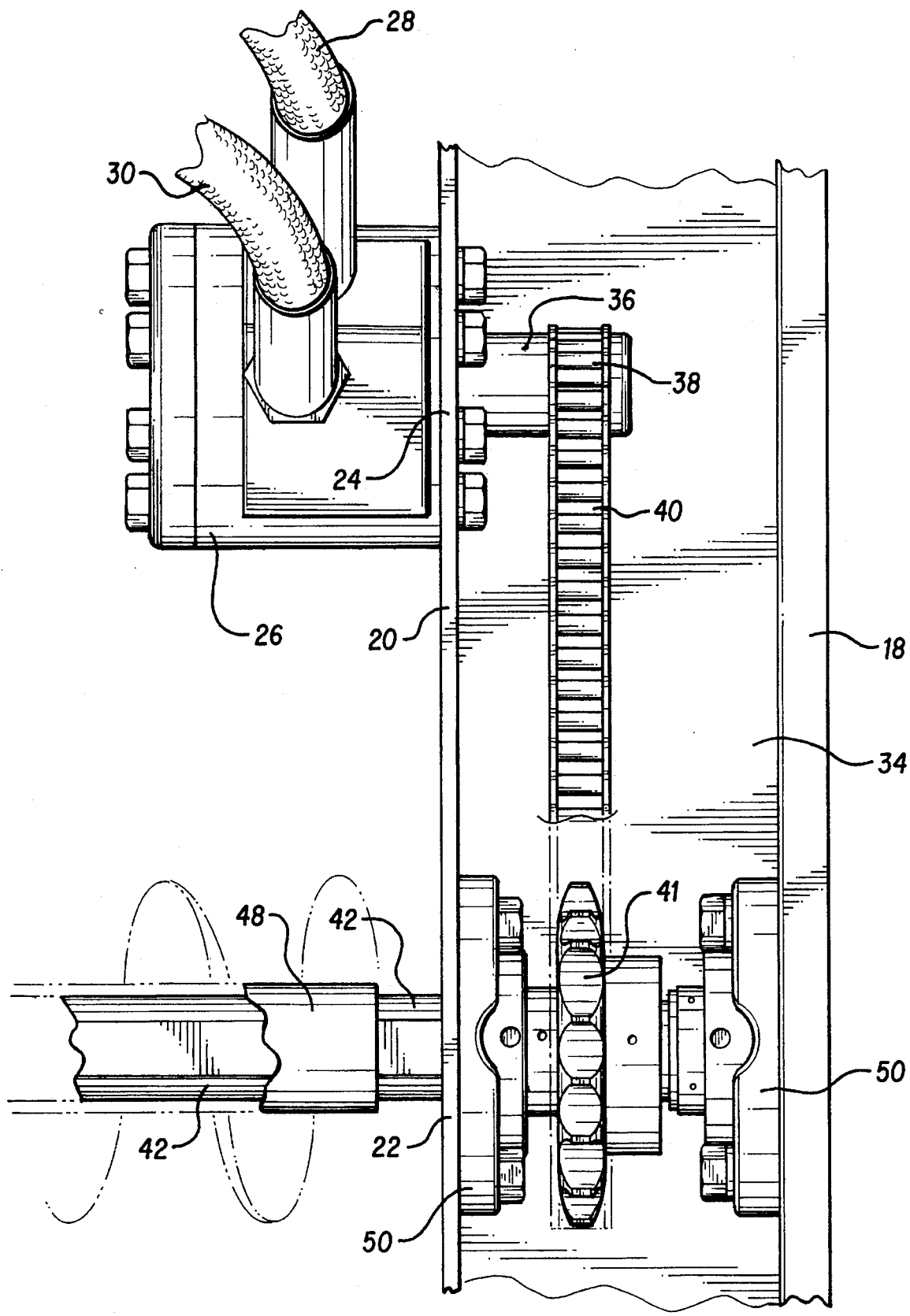
FIG. 3 is a detail, partial cutaway, perspective view of the gears of the present invention.

Mounting means is provided on the rear wall 34 of the materials receptacle 10. In a first embodiment of the invention, there is a loader mounting bracket 56 disposed on the rear wall 34, preferably by welding. This loader mounting bracket 56, shown best in FIG. 1A, includes a cross member 58 having terminal ends 60, two vertical mounting members 62 having upper ends 64 and lower ends 66, and two V-shaped mounting member supports 68, disposed under the lower ends 66 of the vertical mounting members 62, as shown in FIG. 1A. Alternately, there is a single V-shaped mounting member support 69, that supports both lower ends 66 of the vertical mounting members 62, as shown in FIG. 1. Preferably, neither the supports 68 nor the single support 69 are used. In this case, the mounting members 62 lay flush against the back 34 of the bucket. The vertical mounting members 62 are disposed on the rear wall 34, outside of the materials receptacle 10. The upper ends 64 of the vertical mounting members 62 are connected to the terminal ends of the cross member 58. Apertures 70 are disposed in the vertical mounting members 62 as necessary to ensure mating of the loader mounting bracket 56 with extensions 72 of a loader 100. When the materials dispenser 8 is mounted on a loader 100, the materials receptacle 10 can be lifted and then dipped into a source of material, such as a bin or storage area 102 of a truck. In this way, the materials receptacle 10 is filled with materials to be dispensed.

It is to be understood that the present invention is not limited to the embodiments described above, but encompasses any and all embodiments within the scope of the following claims.

I claim:

1. A materials dispenser, comprising:

a materials receptacle having a rear wall, a first side and an opposing second side, said first side having a dispensing aperture and said second side having an axle mounting aperture;

a generally rectangular vertical mounting plate disposed in said materials receptacle, said mounting plate having an auger aperture and a motor aperture;

a motor means;

a drive axle extending from, and rotated by, said motor means, said drive axle extending through said motor aperture in said vertical mounting plate;

a drive gear mounted on said drive axle;

an auger having a first end and a second end, said first end of said auger disposed proximate said dispensing aperture, said second end of said auger extending through said auger aperture;

a tubular guidance flange including a semicircular extension mounted within said receptacle at said dispensing aperture said extension supporting said first end of said auger;

a drive chain;

an auger gear mounted on said second end of said auger, said drive chain engaging said drive gear and said auger gear; and a first bearing unit supporting said auger at said auger aperture and a second bearing unit supporting said auger at said axle mounting aperture.

2. The materials dispenser, according to claim 1, wherein said rectangular vertical mounting plate is disposed approximately six inches from said second side of said materials receptacle.

3. The materials dispenser, according to claim 1, wherein said motor means includes:

a hydraulic motor mounted inside said materials receptacle, on said mounting plate;

a hydraulic supply line; and a hydraulic withdrawal line, said supply line and said withdrawal line providing hydraulic power to said hydraulic motor.

4. The materials dispenser, according to claim 3, further including a springed support rod mounted on said rear wall of said materials receptacle, whereby said supply line and said withdrawal line are supported.

5. The materials dispenser, according to claim 1, further including a cover connected to said materials receptacle, said cover covering and protecting said second end of said auger axle, said drive chain, said drive gear, said auger gear, and said bearings units.

6. The materials dispenser, according to claim 1, further including:

a loader mounting bracket disposed on said rear wall of said materials receptacle, said loader mounting bracket including a cross member having terminal ends, two vertical mounting members having upper ends and lower ends, and two V-shaped mounting member supports, said V-shaped mounting member supports being disposed under said lower ends of said vertical mounting members, said vertical mounting members being disposed on said rear wall of said materials receptacle, outside of said materials receptacle, said upper ends of said vertical mounting members being connected to said terminal ends of said cross member; and apertures disposed in said vertical mounting members, said apertures being dimensioned and configured to ensure mating of said loader mounting bracket with extensions of a loader.

7. The materials dispenser, according to claim 6, wherein said loader mounting bracket is attached to said rear wall by welding.

8. A materials dispenser, consisting essentially of:

a materials receptacle having a first side and an opposing second side, said first side having a dispensing aperture and said second side having an axle mounting aperture;

a generally rectangular vertical mounting plate disposed in said materials receptacle, said mounting plate having an auger aperture and a motor aperture;

a hydraulic motor mounted inside said materials receptacle, on said mounting plate;

a hydraulic supply line;

a hydraulic withdrawal line, said supply line and said withdrawal line providing hydraulic power to said hydraulic motor;

a drive axle extending from, and rotated by, said hydraulic motor, said drive axle extending through said motor aperture in said vertical mounting plate;

a drive gear mounted on said drive axle;

an auger having a first end and a second end, said first end of said auger disposed proximate said dispensing aperture, said second end of said auger extending through said auger aperture;

a tubular guidance flange including a semicircular extension mounted within said receptacle at said dispensing aperture, said extension supporting said first end of said auger;

a drive chain;

an auger gear mounted on said second end of said auger, said drive chain engaging said drive gear and said auger gear; and a first bearing unit supporting said auger at said auger aperture and a second bearing unit supporting said auger at said axle mounting aperture.

* * * * *